United States Patent Office 3,310,235
Patented Mar. 21, 1967

3,310,235
PROCESS AND EQUIPMENTS FOR THE RELEASE OF ACTIVE SUBSTANCES
Hans Zbinden, Basel, Switzerland, assignor to Ciba Limited, Basel, Switzerland, a company of Switzerland
No Drawing. Filed July 20, 1965, Ser. No. 473,525
Claims priority, application Switzerland, Aug. 3, 1964, 10,153/64
7 Claims. (Cl. 239—6)

The present invention provides a process for the prolonged and uniform release of volatile active substances, particularly volatile biocidal organic phosphorus compounds, wherein these active substances are allowed to issue through a layer consisting of ethylene/vinyl acetate copolymer.

The present invention more especially provides a process of the type described above for the release of biocidal vinyl phosphates, and particularly of dimethyldichlorovinyl phosphate or its derivatives.

Examples of the last-named compounds are, in particular, those having the following general formula:

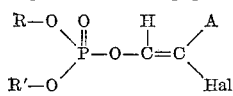

in which R and R' are alkyl groups having 1 to 5 carbon atoms, A is hydrogen or a halogen atom, preferably a chlorine atom, and Hal is a halogen atom, preferably a chlorine atom, for example, diethyldichlorovinyl phosphate, dipropyl- or dibutyl-dichlorovinyl phosphates, diamyldichlorovinyl phosphates, dimethyl- or diethyl-dibromovinyl phosphate, methylethyl-dichlorovinyl phosphate, or halogenation products of these compounds, and especially dimethyl dichlorovinyl phosphate (DDVP).

A further example is the compound of the formula

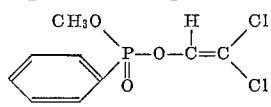

In the process of the invention the layer of copolymer is preferably in the shape of a closed vessel containing the active substance. Particularly good results are achieved if the vessel consisting of the copolymer is surrounded with a closed jacket of a fibre material, particularly a woven cloth of a synthetic fibre, especially nylon; this acts as an evaporation surface. The wall thickness of the copolymer layer may vary between relatively wide limits, e.g. between 50 to 2000µ, and preferably between 100 to 400µ.

The present invention further provides a closed container for the prolonged and uniform release of active substances, particularly of volatile biocidal organic phosphorus compounds, of which the walls comprise a layer of ethylene/vinyl acetate copolymer, having a wall thickness of 50 to 2000µ, preferably 100 to 400µ, with the container optionally being surrounded by a closed jacket of a fibre material, preferably a woven cloth of a synthetic fibre and in particular of nylon, which acts as an evaporation surface.

When being stored, this equipment can usefully be provided with a wrapping which is impermeable to the active substance, e.g. with a wrapping consisting of a multi-layer laminate of paper/aluminum foil/polyethylene film.

French Patent 1,310,865 describes a process in which active substances, e.g. organic phosphoric acid esters, diffuse through a layer of polyvinyl chloride. As compared to this known process the present new process has the advantage of achieving release of the active substance which remains uniform over a longer period of time. Furthermore the equipment needed for the release of the active substance is more simply and cheaply produced than is the case for the equipment according to French Patent 1,310,865.

EXAMPLE

An ampoule, the walls of which consist of 0.4 mm. thick ethylene/vinyl acetate copolymer, is filled with the liquid active substance dimethyldichlorovinyl phosphate, and closed by heat-welding. A nylon woven fabric is then drawn over the ampoule and also closed by heat-welding. The daily release of active substance was determined by weighing. The result is shown in the following table:

Daily release, grams
On the 1st day, 37.19 g. _____ 0.03
On the 3rd day, 37.10 g. _____ 0.02
On the 4th day, 37.08 g. _____ 0.07
On the 5th day, 37.01 g. _____ 0.035
On the 7th day, 36.94 g. _____ 0.05
On the 10th day, 36.79 g. _____ 0.04
On the 13th day, 36.68 g. _____ 0.04
On the 18th day, 36.48 g. _____ 0.045
On the 21st day, 36.34 g. _____ 0.047

Similar constant release of the active substance was achieved if several of the ampoules described above are fed into a rather long woven nylon fabric tube, and the latter then heat-welded at its ends and between the individual ampoules.

The copolymer used was a product marketed by Union Carbide Corporation, U.S.A., under the designation "DQQ–1868," melting index (ASTM–Method D1238) =2.5 density (ASTM–Method D1505) =0.943; softening point (ASTM–Method D1525) =64° C.

What is claimed is:
1. A process for the prolonged and uniform release of a volatile active substance wherein this substance is allowed to issue through a layer of ethylene/vinyl acetate copolymers.
2. A process as claimed in claim 1 wherein the volatile active substance is a volatile biocidal organic phosphorus compound.
3. A process as claimed in claim 1 wherein the volatile active substance is a volatile biocidal vinyl phosphate.
4. A process as claimed in claim 1 wherein the volatile active substance is dimethyldichloro-vinyl phosphate.
5. A process as claimed in claim 1 wherein the layer of copolymer is shaped in the form of a closed vessel.
6. A process as claimed in claim 1 wherein the thickness of the layer is from 50 to 2000µ.
7. A closed container whose walls comprise a layer of ethylene/vinyl acetate copolymer having a wall thickness of 50 to 2000µ.

References Cited by the Examiner
UNITED STATES PATENTS 2,567,905 9/1951 Field _____ 260—30.2
2,626,833 1/1953 Valentine _____ 239—56
2,757,957 8/1956 Samann _____ 239—58
3,169,705 2/1965 Geiger _____ 239—43

EVERETT W. KIRBY, Primary Examiner.